(12) United States Patent
Raftari et al.

(10) Patent No.: US 7,116,077 B2
(45) Date of Patent: *Oct. 3, 2006

(54) DIAGNOSTIC SYSTEM AND METHOD FOR AN ELECTRIC MOTOR USING TORQUE ESTIMATES

(75) Inventors: Abbas Raftari, Northville, MI (US); Mathew Boesch, Plymouth, MI (US); Vijay Garg, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 392 days.

This patent is subject to a terminal disclaimer.

(21) Appl. No.: 10/644,382

(22) Filed: Aug. 20, 2003

(65) Prior Publication Data

US 2004/0103719 A1    Jun. 3, 2004

Related U.S. Application Data

(63) Continuation-in-part of application No. 10/063,345, filed on Apr. 12, 2002, now abandoned.

(51) Int. Cl.
H02P 23/00 (2006.01)
H02P 25/00 (2006.01)
H02P 27/00 (2006.01)

(52) U.S. Cl. .................. 318/798; 318/767; 318/800; 318/806

(58) Field of Classification Search ............ 318/138, 318/254, 439, 432, 434, 700, 701–811
See application file for complete search history.

(56) References Cited

U.S. PATENT DOCUMENTS

| | | | |
|---|---|---|---|
| 5,107,195 A | 4/1992 | Lyons et al. | |
| 5,272,429 A * | 12/1993 | Lipo et al. | .................. 318/808 |
| 5,343,970 A | 9/1994 | Severinsky et al. | |
| 5,345,158 A | 9/1994 | Kilman et al. | |
| 5,418,440 A | 5/1995 | Sakaguchi et al. | |
| 5,477,163 A | 12/1995 | Kilman et al. | |
| 5,689,170 A | 11/1997 | Ishikawa | |
| 5,699,253 A | 12/1997 | Puskorius et al. | |
| 5,732,382 A | 3/1998 | Puskorius et al. | |
| 5,844,385 A | 12/1998 | Jones et al. | |
| 5,864,217 A | 1/1999 | Lyons et al. | |
| 5,867,004 A | 2/1999 | Drager et al. | |
| 5,998,954 A * | 12/1999 | Scholten | .................. 318/599 |

(Continued)

FOREIGN PATENT DOCUMENTS

JP    08237985 A    9/1996

(Continued)

*Primary Examiner*—Lincoln Donovan
*Assistant Examiner*—Tyrone Smith
(74) *Attorney, Agent, or Firm*—David B. Kelley; Brooks & Kushman

(57) ABSTRACT

The present invention can diagnose a potential discrepancy in electrical operating characteristics of a three phase electric motor by generating two independent torque estimates using a plurality of current sensors and a shaft position sensor. The invention provides a strategy to generate two independent torque estimates of a three phase electric motor comprising first and second systems to determine currents in two motor phases, first and second systems to generate a first and second estimate of motor shaft position, and first and second systems to generate first and second estimates of motor torque using the first and second systems to determine current in each motor phase and the first and second values of motor shaft position. The present invention detects also an electrical operating characteristic discrepancy in an electric motor-propelled vehicle's electrical components and subsystems, including single subsystem discrepancies between the two independent torque estimates.

8 Claims, 3 Drawing Sheets

U.S. PATENT DOCUMENTS

| | | |
|---|---|---|
| 6,005,364 A | 12/1999 | Acarnley |
| 6,067,801 A | 5/2000 | Harada et al. |
| 6,135,914 A | 10/2000 | Yamaguchi et al. |
| 6,155,954 A | 12/2000 | Itoyama et al. |
| 6,173,226 B1 * | 1/2001 | Yoshida et al. ............... 701/51 |
| 6,193,628 B1 | 2/2001 | Hrovat et al. |
| 6,208,034 B1 | 3/2001 | Yamaguchi |
| 6,211,633 B1 | 4/2001 | Jones et al. |
| 6,219,607 B1 | 4/2001 | Piepenbrink et al. |
| 6,490,511 B1 | 12/2002 | Raftari et al. |
| 6,553,287 B1 | 4/2003 | Supina et al. |
| 6,668,202 B1 * | 12/2003 | Makino et al. ............... 700/56 |
| 6,736,236 B1 * | 5/2004 | Kurishige et al. .......... 180/446 |
| 6,756,757 B1 * | 6/2004 | Marcinkiewicz et al. ... 318/432 |
| 2002/0117990 A1 * | 8/2002 | Sawada et al. ............. 318/727 |
| 2004/0134267 A1 * | 7/2004 | Boesch et al ............... 73/118.1 |
| 2004/0168844 A1 * | 9/2004 | Goransson et al. ......... 180/242 |
| 2005/0062451 A1 * | 3/2005 | Takemori et al. ........... 318/685 |

FOREIGN PATENT DOCUMENTS

| | | | |
|---|---|---|---|
| JP | 10323072 A | * | 12/1998 |
| JP | 11031014 A | * | 2/1999 |
| JP | 11184512 A | | 7/1999 |
| JP | 2000287472 A | * | 10/2000 |

* cited by examiner

DIAGNOSTIC SYSTEM AND METHOD FOR AN ELECTRIC MOTOR USING TORQUE ESTIMATES

CROSS-REFERENCE TO RELATED APPLICATION

This application is a continuation-in-part of U.S. application Ser. No. 10/063,345, filed Apr. 12, 2002 and abandoned Aug. 20, 2003, entitled "Diagnostic Method for an Electric Motor Using Torque Estimates," which is assigned to the assignee of the present invention.

BACKGROUND OF THE INVENTION

1. Field of the Invention

The invention relates generally to an electrically powered vehicle, such as an electric vehicle (EV), a hybrid electric vehicle (HEV) or a fuel cell vehicle (FCV). More specifically, the invention relates to a strategy to diagnose a potential deviation in operating characteristics of an electric motor. The present invention can determine two independent electric motor torque estimates using a plurality of current transducers and optionally a shaft position sensor for the traction motor.

2. Background Art

The invention may be used in a hybrid electric vehicle of the type schematically shown in FIG. 1 of co-pending application Ser. No. 09/683,026, filed Nov. 9, 2001, which issued on Feb. 10, 2004 as U.S. Pat. No. 6,688,411; in FIG. 1 of co-pending application Ser. No. 09/712,436, filed Nov. 14, 2000, which issued on Dec. 16, 2003 as U.S. Pat. No. 6,664,651; as well as in co-pending applications Ser. No. 10/063,345, filed Apr. 12, 2002, now abandoned; and Ser. No. 09/966,612, filed Oct. 1, 2001, which issued on May 11, 2004 as U.S. Pat. No. 6,735,502. Each of these co-pending applications is assigned to the Assignee of the present invention.

The need to reduce fossil fuel consumption and emissions in automobiles and other vehicles predominately powered by internal combustion engines (ICEs) is well known. Vehicles powered by electric motors attempt to address these needs. Another alternative solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 to Severinsky.

The HEV is described in a variety of configurations. Many HEV patents disclose systems in which an operator is required to select between electric motor and internal combustion engine operation. In other configurations, the electric motor drives one set of wheels and the ICE drives a different set.

Other configurations include, for example, a series hybrid electric vehicle (SHEV) configuration. A series hybrid vehicle has an engine (typically an ICE) connected to an electric motor/generator. The generator, in turn, provides electricity to a battery and another motor, called a traction motor. In the SHEV, the traction motor can function as the sole source of wheel torque. There is no direct mechanical connection between the engine and the drive wheels. A parallel hybrid electrical vehicle (PHEV) configuration has an engine (typically an ICE) and an electric motor that work together in varying degrees to provide the necessary wheel torque to drive the vehicle. Additionally, in the PHEV configuration, the motor can be used as a generator to charge the battery using power produced by the ICE.

A parallel/series hybrid electric vehicle (PSHEV) has characteristics of both PHEV and SHEV configurations. It sometimes is referred to as a "split-power" configuration. In one of several types of PSHEV configurations, the ICE is mechanically coupled to two electric motors in a planetary gear-set transaxle. A first electric motor, the motor/generator, is connected to a sun gear. The ICE is connected to a planetary gear carrier. A second electric motor, a traction motor, is connected to a ring (output) gear via additional gearing in a transaxle. Engine torque can power the generator to charge the battery. The generator can also contribute to the necessary wheel (output shaft) torque. The traction motor is used to contribute wheel torque and to recover braking energy to charge the battery. In this configuration, the generator can selectively provide a reaction torque that may be used to control engine speed. In fact, the engine, motor/generator and traction motor can provide a continuous variable transmission (CVT) effect. Further, the HEV presents an opportunity to better control engine idle speed, compared to conventional vehicles, by using the generator to control engine speed.

The desirability of combining an ICE with electric motors is clear. There is potential for reducing vehicle fuel consumption and emissions with no appreciable loss of vehicle performance or driveability. The HEV allows the use of smaller engines, regenerative braking, electric boost, and even operation of the vehicle with the engine shut down.

One such area of development for optimizing potential benefits of a hybrid electric vehicle involves calculating torque estimates delivered by an electric motor or motors. An effective and successful HEV design (or any vehicle powertrain propelled by electric motors and optionally capturing regenerative braking energy) requires reliable operation that can be improved through careful diagnosis of electric motor operation. Thus there is a need for a strategy to effectively detect potential discrepancies in electrical operating characteristics in an electric motor propelled vehicle's electrical components and sub-systems.

Previous efforts have used rotor position sensors or estimates as part of the control strategy for an electric motor. For example, Jones et al. (U.S. Pat. No. 6,211,633) disclose an apparatus for detecting an operating condition of a machine by synchronizing sampling instants with the machine condition so that reliability data are obtained. The operating condition may be the position of the rotor, in which case estimates of the rotor position and rotor velocity at each of the sampling instants are developed.

Lyons et al. (U.S. Pat. No. 5,864,217) disclose an apparatus and method for estimating rotor position and commutating a switched reluctance motor (SRM), using both a flux/current SRM angle estimator and a toothed wheel generating a magnetic pickup. Phase errors can be compensated by adjusting the angle input to the commutator as a function of estimated speed. Alternately, the flux/current SRM angle estimator can be run in background mode to tune the toothed wheel interrupt angle signal at different speeds.

Drager et al. (U.S. Pat. No. 5,867,004) disclose a control for operating an inverter coupled to a switched reluctance machine that includes a relative angle estimation circuit for estimating rotor angle for a phase in the switched reluctance machine.

Lyons et al. (U.S. Pat. No. 5,107,195) disclose a method and apparatus for indirectly determining rotor position in a switched reluctance motor that is based on a flux/current model of the machine, which model includes multi-phase saturation, leakage, and mutual coupling effects.

Lastly, Acarnley (U.S. Pat. No. 6,005,364) discloses a motor monitoring and control circuit that calculates a value parameter for a position of the motor at given instants. The same parameter (which may be position or speed of a rotor) is then measured at subsequent instants. These values are used to compute a future value of the parameter.

The use of two independent torque estimates to diagnose a potential deviation in the operating characteristics of the electric motor in an electric motor propelled vehicle is unknown in the prior art.

SUMMARY OF THE INVENTION

Accordingly, the present invention provides a strategy to effectively detect the operating conditions in an electric-motor-propelled vehicle's electrical components and subsystems by creating two independent torque estimates of an electric motor for a hybrid electric vehicle (HEV) using a plurality of current transducers and, optionally, a shaft position sensor. Discrepancies between the two independent torque estimates or the signals used to create the two independent torque estimates can be indicative of potential discrepancies in electrical operating conditions such as a stray current leakage condition.

More specifically, the invention provides a strategy to generate two independent torque estimates for a three phase electric motor comprising first and second systems to determine current in each motor phase, third and fourth systems to generate a first and second estimate of motor shaft position, and fifth and sixth systems to generate first and second estimates of motor torque using the first and second systems to determine current in each motor phase and the first and second estimates of motor shaft position.

The strategy uses four current sensors to generate four measured currents, which are used for the first and second systems to determine current in each motor phase. The estimate of motor shaft position can be made using Kalman filters. Alternatively the motor shaft position estimate can be made using a resolver.

Other objectives and features of the present invention will become more apparent to persons having ordinary skill in the art to which the present invention pertains from the following description, taken in conjunction with the accompanying figures.

BRIEF DESCRIPTION OF THE DRAWINGS

The foregoing objects, advantages, and features, as well as other objects and advantages, will become apparent with reference to the description and figures below, in which like numerals represent like elements and in which.

DETAILED DESCRIPTION OF THE PREFERRED EMBODIMENTS

Figure 1:
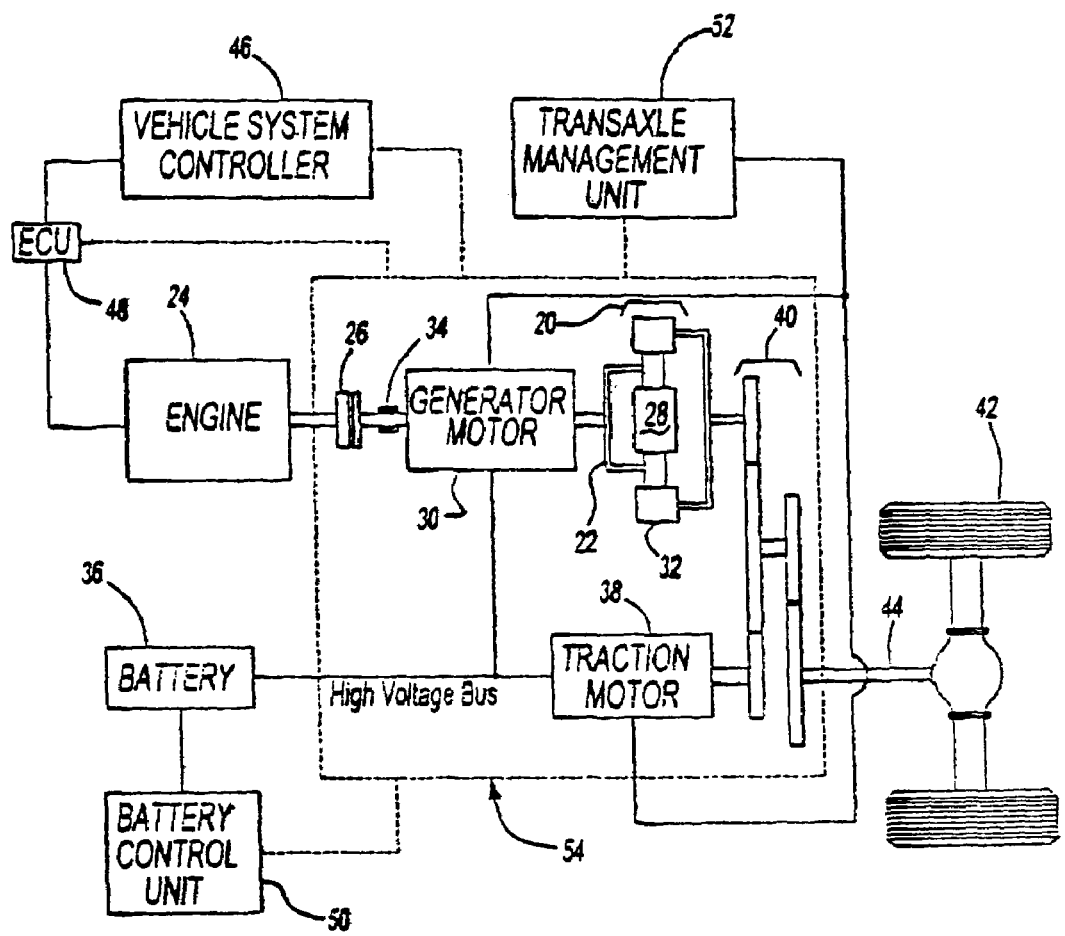
FIG. 1 illustrates a general hybrid electric vehicle (HEV) configuration of the type disclosed in the co-pending application identified in the foregoing "Background of Invention", which may incorporate the present invention.

The present invention relates to electric motors. For demonstration purposes and to assist in understanding the present invention, it is described in a hybrid electric vehicle (HEV) application. FIG. 1 demonstrates just one possible HEV configuration, specifically a parallel/series hybrid electric vehicle configuration.

In a basic HEV, a planetary gear set 20 mechanically couples a carrier 22 to an engine 24 via a disconnect clutch 26. The planetary gear set 20 also mechanically couples a sun gear 28 to a generator-motor 30 and a ring (output) gear 32. The generator-motor 30 may be braked by a generator brake 34 to provide reaction torque for carrier 22. It is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

The planetary gear set 20 splits the output energy of engine 24 into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides an opportunity to use energy directly from the series path, essentially running off power created by the generator-motor 30. This reduces losses associated with converting electrical energy into and from chemical energy in the battery 36 and allows all energy of engine 24, minus conversion losses, to reach the drive wheels 42.

A vehicle system controller (VSC) 46 controls many components in this HEV configuration by connecting to each component's controller. An engine control unit (ECU) 48 connects to the engine 24 via a hardwire interface. All vehicle controllers can be physically combined in any combination or can stand as separate units. They are described as separate units here because they each have distinct functions. The VSC 46 communicates with the ECU 48, as well as a battery control unit (BCU) 50 and a transaxle management unit (TMU) 52, through a communication network such as a controller area network (CAN) 54. The BCU 50 connects to the battery 36 via a hardwire interface. The TMU 52 controls the generator motor 30 and traction motor 38 via a hardwire interface.

Figure 2:
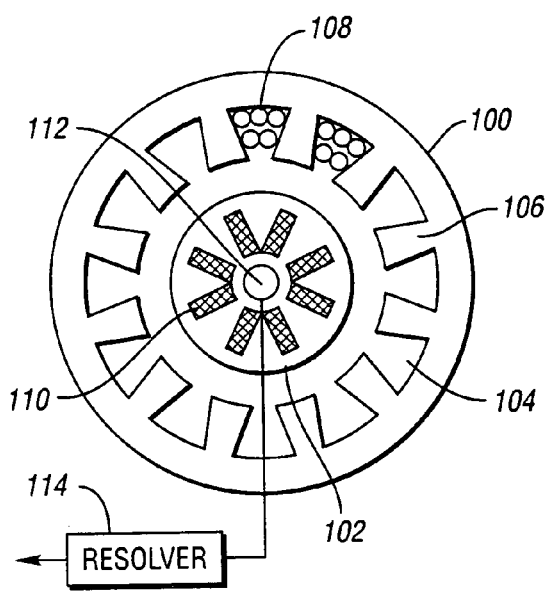
FIG. 2 illustrates an electric traction motor for the hybrid electric vehicle shown in FIG. 1.
Figure 3:
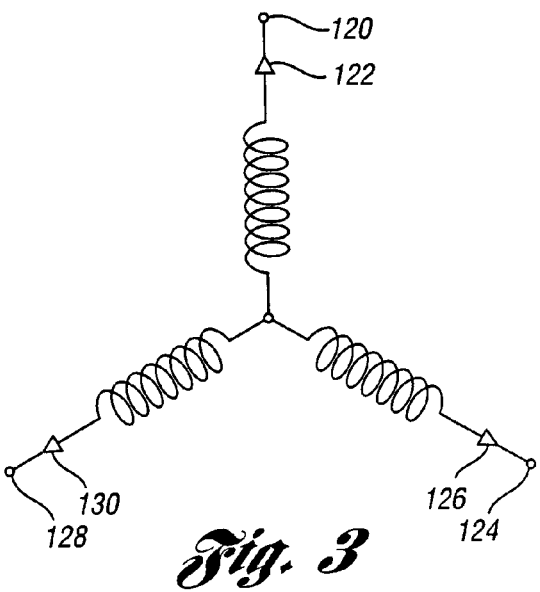
FIG. 3 illustrates electric motor stator windings connected in a "wye" configuration for use in the traction motor of FIG. 1.

A basic diagram of the traction motor 38 is illustrated in FIG. 2. The traction motor 38 has a stator 100, having slots 104 and teeth 106. Motor windings 108 carry electric current through the traction motor 38. The windings are connected in a "wye" configuration, as illustrated in FIG. 3. Interior to stator is the rotor 102. The illustrated rotor 102 has permanent interior magnets 110. The motor shaft 112 passes through the rotor 102. A resolver 114 can be connected to the motor shaft 112.

The windings 108 of a three phase electric motor can be represented as being arranged in a "wye." Each of the three phases, commonly referred to as phases "a," "b" and "c," are represented by one leg of the "wye." The "wye" configuration is illustrated in FIG. 3. Phase "a" 120 would have a corresponding electric current, current ($I_a$) 122, passing through it. Similarly, phases "b" 124 and "c" 128 would have corresponding electric currents, current ($I_b$) 126 and current ($I_c$) 130, respectively, passing through them as well. Measurement or estimation of all three motor phase currents (122, 126, and 130) and the motor shaft 112 position angle is required to calculate the motor torque.

In the present invention the VSC 46 can detect the motor's operating condition generally by two procedures (shown in FIGS. 4 and 5) using alternate types of independent estimations of machine torque. For the embodiments presented, four current sensors per electric motor are used. Many other types of configurations are possible. Sensor output can be sent to the VSC 46 where appropriate action may be taken, such as lighting an indicator lamp or sounding an indicator tone to notify the operator of a potential system electrical deviation in operating characteristics.

Figure 4:
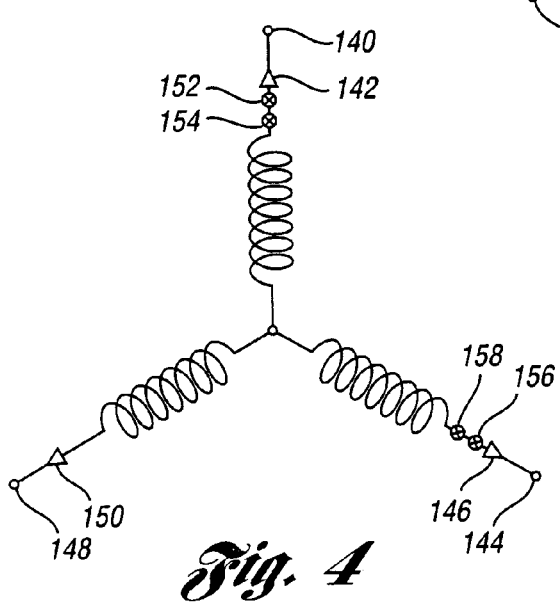
FIG. 4 illustrates an arrangement of four current sensors having two sensors in each of two phases, which is used in practicing the present invention.

FIG. 4 shows a first embodiment of the present invention. FIG. 4, like FIG. 3, shows the "wye" configuration of the three phases of the electric motor. In practice, any individual leg of the "wye" can be any of the individual phases. In FIG. 4, the phases will be referred to as phases "x," "y" and "z," where phases "x," "y" and "z" can be any ordering of phases "a," "b" or "c." Phase "x" 140 would having a corresponding electric current, current "x" ($I_x$) 142, passing through it. Similarly, phases "y" 144 and "z" 148 would have corresponding electric currents, current "y" ($I_y$) 146 and current "z" ($I_z$) 150, respectively, passing through them as well.

Added to the "wye" configuration are four current sensors. The first current sensor 152 gives a measured current "x" ($i_x$). The second current sensor 154 gives a second measured current "x" ($i_x'$). The third current sensor 156 gives a measured current "y" ($i_y$). The fourth current sensor 158 gives a second measured current "y" ($i_y'$). These sensors can be of any type known in the art for measuring motor phase current, such as a resistive shunt or non-contacting current transducers. They can be either active or passive.

Figure 5:
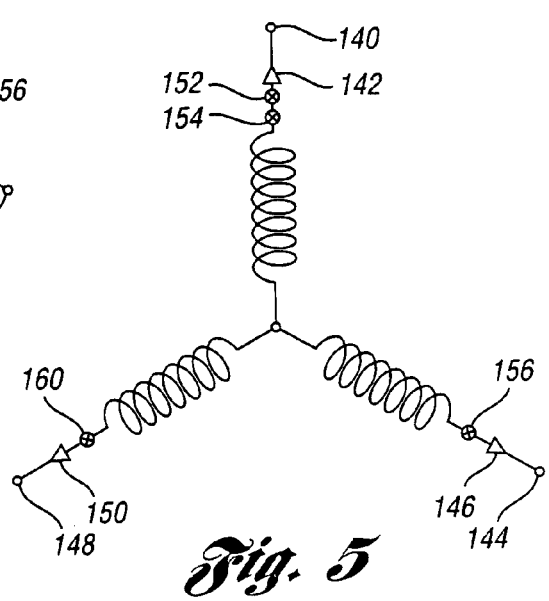
FIG. 5 illustrates an alternate arrangement of four current sensors, which may be used in practicing the present invention.

FIG. 5 shows an alternative arrangement of four current sensors on the legs of the "wye" configuration representing the phases of the electric motor. In this embodiment, the first current sensor 152 gives a measured current "x" ($i_x$). The second current sensor 154 gives a second measured current "x" ($i_x'$). The third current sensor 156 gives a measured current "y" ($i_y$). The fourth current sensor 160 gives a measured current "z" ($i_z'$).

Figure 6:
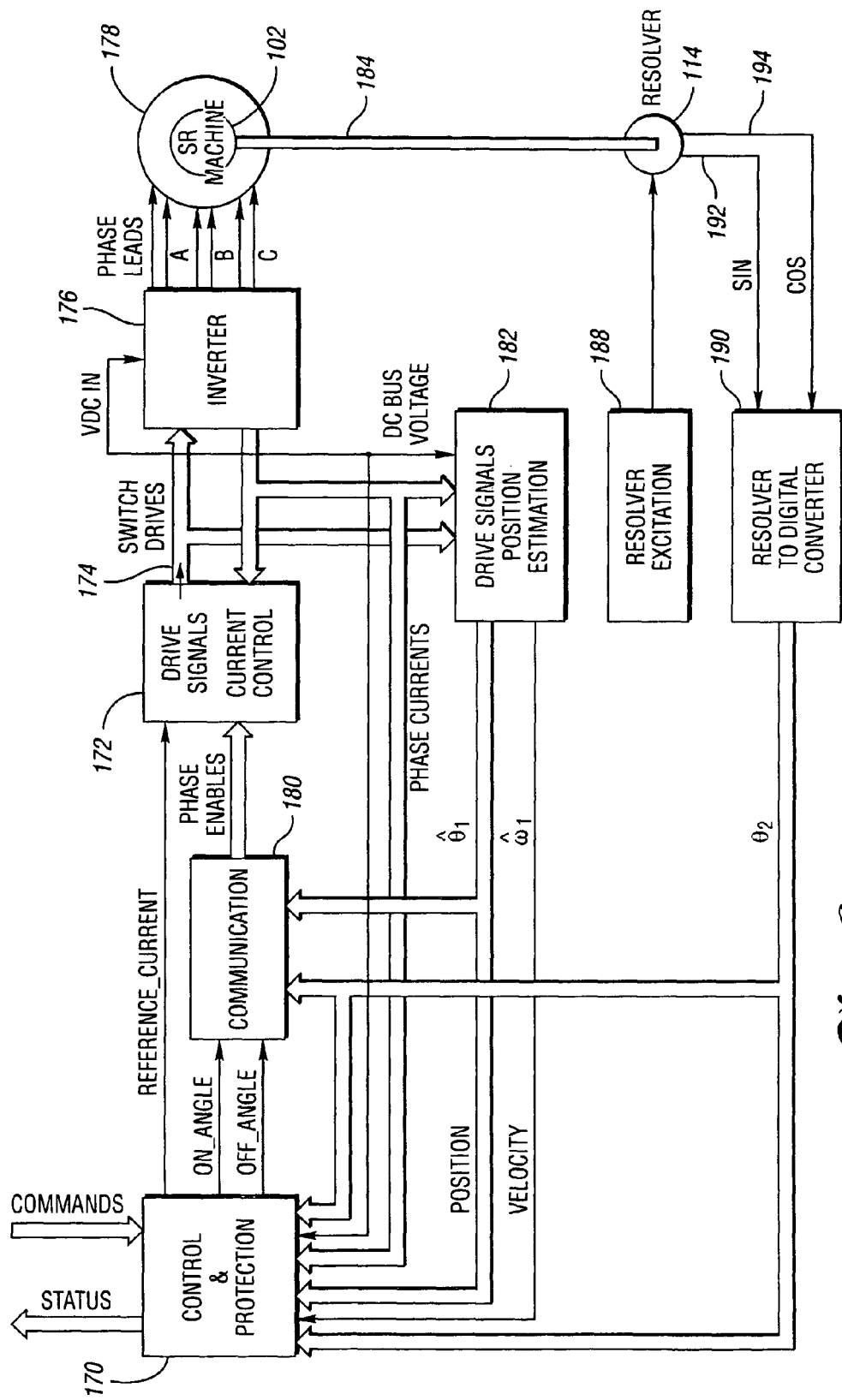
FIG. 6 illustrates the strategy of the present invention in block diagram form.

FIG. 6 illustrates a possible strategy using the present invention in block diagram form. An inverter control for operating a switched reluctance machine 178 includes resolver 114 coupled by a motive power shaft 184 to the rotor 102 of the switched reluctance machine 178. Excitation is provided by a resolver excitation circuit 188. The resolver 114 develops first and second signals over lines 192 and 194 that have a phase quadrature relationship (also referred to as sine and cosine signals). A resolver-to-digital converter 190 is responsive to the magnitudes of the signals on the lines 192 and 194 and develops a digital output representing the position of the rotor 102 of the switched reluctance machine 178. The position signals are supplied along with a signal representing machine rotor 102 velocity to a control and protection circuit 170. The rotor 102 position signals are also supplied to a commutation circuit 180 and a current control circuit 172 having an input coupled to an output of the control and protection circuit 170. Circuits 170 and 172 further receive phase current magnitude signals as developed by an inverter 176. The circuits 170 and 172 develop switch drive signals on lines 174 for the inverter 176 so that the phase currents flowing in the windings of the switched reluctance machine 178 are properly commutated.

A position estimation circuit or subsystem 182 is responsive to the phase current magnitudes developed by the inverter 176, switch control or drive signals for switches in the inverter 176 and DC bus voltage magnitude to develop position and velocity estimate signals for the control and protection circuit 170. In addition, the position estimate signals are supplied to the commutation circuit 180. The current control circuit 172 is responsive to the phase current magnitudes developed by the inverter 176, as well as phase enable output signals developed by the commutation circuit 180 and a reference current signal developed by the control and protection circuit 170. The current control circuit 172 produces the switch control or drive signals on lines 174 for the inverter 176. Measurements from these systems allow the development of strategies to estimate normal traction motor 38 torque.

The resolver 114, known in the prior art, is a direct measurement of rotor 102 position angle. A Kalman filter based estimation method, also known in the art, can generate a second independent calculation of the rotor 102 position angle in electric and hybrid-electric vehicles.

Currents "a" 122, "b" 126, and "c" 130 in the three phases of the "wye" {"a" 120, "b" 124, and "c" 128} are actively switched at high frequency by the three phase inverter 176 between the motor windings 108 and a direct current voltage source, such as the battery 36.

The traction motor 38 has the ideal torque "T" characteristic as follows:

Equation 1:

$$T = \frac{3}{4} p[MI_f I_q + (L_d - L_q) I_d I_q] \qquad \text{Equation 1:}$$

where:
p is the number of motor poles (known),
M is the rotor to stator mutual inductance (known),
$I_f$ is the "equivalent" current corresponding to the permanent magnet magnetic flux (known),
$L_d$ is the direct axis inductance (known),
$L_q$ is the quadrature axis inductance (known),
$I_d$ is the "direct" axis current (estimated from measured and other values), and
$I_q$ is the "quadrature" axis current (estimated from measured and other values).

To generate relative currents $\{I_d, I_q\}$ in a frame that rotates at the rotor velocity, one can write:

Equation 2:

$$I_d = \frac{2}{3}[I_a \cos\theta + I_b \cos(\theta - \gamma) + I_c \cos(\theta + \gamma)] \qquad \text{Equation 2:}$$

Equation 3:

$$I_q = -\frac{2}{3}[I_a \sin\theta + I_b \sin(\theta - \gamma) + I_c \sin(\theta + \gamma)] \qquad \text{Equation 3:}$$

where:
$I_a$, $I_b$, $I_c$ are the state "wye" coil current 122, 126, and 130,

θ is the rotor position angle, and

Y is the electrical phase angle between stator coils, and where:

$$\gamma = \frac{2}{3}\pi = 120 \text{ deg.}$$

To generate two independent estimates of electrical machine torque by using Equation 1, two independent ways to find $I_d$, and $I_q$ are required. These currents in turn each depend upon two signal sets:

1. The "wye" connected stator phase coil currents $\{I_a$ 122, $I_b$ 126, $I_c$ 130$\}$, and
2. The motor shaft 112 position angle θ.

At least two independent strategies are described to independently estimate each of these two signal sets. For the first strategy, assume each of the three legs of the stator coil has current flowing in that leg. The machine winding neutral at the center of the "wye" is not connected, which is true for the case of inverter driven motors. Because Kirchoff's current law, known to those skilled in the art, applies to the "wye" connected circuit, the currents $\{I_a$ 122, $I_b$ 126, $I_c$ 130$\}$ obey the relationship:

$$I_a + I_b + I_c = 0. \quad \text{Equation 4:}$$

Only two currents need to be known to estimate the third current.

For example, if $\{i_a, i_b, i_c\}$ represent current sensor outputs measuring the currents $\{I_a$ 122, $I_b$ 126, $I_c$ 130$\}$, then by measuring any two, for example $\{i_a, i_b\}$, one can estimate the third $i_c$ as:

$$\hat{i}_c = -(i_a + i_b) \quad \text{Equation 5:}$$

where $\hat{i}_c$ represents an estimated, not measured, output signal. By using two current sensors, we have estimated the three phase stator currents as $\{i_a, i_b, \hat{i}_c\}$.

To generate a redundant and completely independent second strategy to estimate stator currents, we cannot rely on either sensor indicating $\{i_a, i_b\}$. Instead, we can redundantly measure $\{i_a, i_b\}$ with two additional sensors $\{i_a', i_b'\}$, as in FIG. 4, and apply Equation 5 to generate the second estimate of $i_c'$ as:

$$\hat{i}_c' = -(i_a' + i_b').$$

Alternatively, we might choose to measure $i_c'$ directly, as in FIG. 5, and either of $\{i_a', i_b'\}$ directly, and then apply Equation 5 to estimate the remaining current as:

$$\hat{i}_b' = -(i_a' + i_c'), \text{ or}$$

$$\hat{i}_a' = -(i_b' + i_c').$$

This dual stator current estimation is summarized in Table 1, where $\{$"x" "y" "z"$\}$ are any ordering of the stator coils $\{$"a" "b" "c"$\}$.

TABLE 1

Alternate Ways to Estimate One of the Three Stator Currents

| Actual Current | Independent Strategy 1: Use Sensors and Estimators | Independent Strategy 2: Use any Column of Sensors and Estimators | | |
|---|---|---|---|---|
| $I_x$ 142 | $i_x$ | $i_x'$ | $i_x'$ | $-(i_y' + i_z')$ |
| $I_y$ 146 | $i_y$ | $i_y'$ | $-(i_x' + i_z')$ | $i_y'$ |
| $I_z$ 150 | $-(i_x + i_y)$ | $-(i_x' + i_y')$ | $i_z'$ | $i_z'$ |

Referring to the Table 1, the far left column for Independent Strategy 2 redundantly measures the same two phase currents $\{$"x" 142, "y" 146$\}$ as does Independent Strategy 1. Putting two current sensors in the same leg may simplify the sensor packaging if two sensors $\{$x 152, x'154$\}$, for example, can share any of their non-critical components. Such non-critical components can include passive parts such as a sensor housing, mounting fasteners, ferrite core and electrical connector housing. In this case, Equation 4 can be validated as Equation 7 as follows:

$$i_x + i_y + -(i_x' + i_y') = 0.$$

Furthermore, sensors in the same leg can be cross-checked as Equation 8 as follows:

$$(i_x - i_x') = 0,$$

$$(i_y - i_y') = 0.$$

Any stray current leakage in coil "c" (due to short circuit deviations in operating characteristics in wiring to the coil, the coil drivers, and between the coil windings and the stator core) is not explicitly sensed.

Alternatively, the right two columns of Independent Strategy 2 redundantly measure only one of the two phase currents $I_x$ 142 or $I_y$ 146 as measured in Independent Strategy 1. The other phase current $I_z$ 150, has a separate sensor 160 to generate signal $i_z'$, resulting in three unique signals $\{i_x, i_y, i_z'\}$ to verify Equation 4 as Equation 9 as follows:

$$i_x + i_y + i_z' = 0.$$

If either of the last two columns in the table is selected, any stray current leakage in stator coil c is explicitly sensed, which may enable detection of additional faults causing current leakage in stator coil c.

In using a total of four current sensors on two or three legs of the traction motor's "wye" windings as in FIGS. 4 and 5, all three current measurements can be generated in two independent ways, and cross-checked to detect whether any one or more measurements should be faulted.

All present inverter motor control technologies require the rotor 102 position θ according to Equations 2 and 3. Motor shaft 112 angle θ can be measured directly by a sensor called the resolver 114, or estimated using an observer or Kalman filter based upon the measured motor currents.

An alternate embodiment of the present invention adds the resolver 114 to the embodiment described above. Traditionally, the inverter torque motor controls use the resolver 114, composed of a "toothed" ring consisting of a plurality of teeth rotating with the motor shaft 112 being measured, and one or more stationary "tooth" sensors of some technology, be it optical, variable reluctance, Hall effect, or other technology known in the art. If one "toothed" ring and one sensor are used, the resolver 114 is also called a "tone wheel." The tone wheel measures relative position, and it is not capable of sensing direction of travel. Some "tone wheels" omit a tooth as a reference absolute position, but measurement is only relative, so measurement during changes of direction is impossible. If two "tooth" sensors are used, the resolver 114 can sense direction, but it still cannot measure absolute position. If more than two "tooth" sensors are used, the resolver 114 can sense direction and absolute position. Some drawbacks of resolvers are their expense, high failure rates, and requirement of a high speed interface at the microprocessor that receives their output signals.

Methods have been developed to estimate the motor shaft 112 position. The estimate being derived not from a resolver 114, but from implicit characteristics of the motor. One such characteristic of an inductance motor is the mutual inductance between the stator coils and the induced current in the rotor 102, which is dependent upon the relative angle between the two and can be estimated from the motor phase currents $\{I_a\ 122, I_b\ 126, I_c\ 130\}$. Another characteristic that can be used to estimate motor shaft 112 position is the back EMF of the motor, known to those skilled in the art as a voltage across the coil that increases with motor speed.

There are well-documented methods that capitalize on these position dependent motor characteristics to estimate the motor shaft 112 relative position. One method is an observer. Another method is a special case of observer called a Kalman filter. In general, the observer will compute by Equation 10:

$$\hat{\theta}=F(s)(I_a,I_b,I_c)$$

where F(s) is the observer transfer function.

To generate separate and independent estimates of $\hat{\theta}$ motor shaft 112 position, a first estimate is generated using the stator current estimation approach of Independent Strategy 1 given above, and a second estimate using the Independent Strategy 2. The combined current and motor shaft 112 position measuring method can detect all single point deviations in desired operating characteristics and is robust in that it can enable safe, if not complete, operation even when such deviations occur and are detected.

Alternatively, one independent motor shaft 112 angle may be measured with a resolver 114, and a second independent motor shaft 112 angle may be estimated using the proposed observer or Kalman filter and either of the phase current measuring proposals.

The above-described embodiments of the invention are provided purely for purposes of example. Variations, modifications, and applications of the invention may be made by persons skilled in the art without departing from the scope of the invention. All such variations, modifications and applications, as well as equivalents thereof, are intended to be covered by the following claims.

What is claimed:

1. A method to diagnose potential discrepancies in electrical operating characteristics in a three phase electric motor comprising the steps of:
    determining first currents in two phases of the electric motor with a first set of current sensors;
    estimating a first current in a third phase of the electric motor;
    determining a first value of motor shaft position;
    estimating a first value of motor torque using the first currents in the two motor phases and the first value of motor shaft position;
    determining second currents in the two motor phases with a second set of current sensors;
    estimating a second current in the third phase of the electric motor;
    determining a second value of motor shaft position;
    estimating a second value of motor torque using the second currents in each motor phase and the second value of motor shaft position; and
    comparing the first and second estimates of motor torque.

2. The method according to claim 1, further comprising the step of notifying a motor operator of a potential discrepancy in electrical operating characteristics.

3. The method according to claim 1, wherein the step of estimating a first current in a third phase of the electric motor comprises:
    determining a first measured current in a first phase of the electric motor with a first current sensor;
    determining a first measured current in a second phase of the electric motor with a second current sensor; and
    estimating a first current in the third phase of the electric motor based on the first measured currents in the first and second phases of the motor.

4. The method according to claim 1, wherein the step of generating the first value of motor shaft position is accomplished by using a Kalman filter.

5. The method according to claim 1, wherein the step of estimating a second current in the third motor phase comprises:
    determining a second measured current in a first phase of the electric motor with a third current sensor;
    determining a second measured current in a second phase of the electric motor with a fourth current sensor; and
    estimating a second current in a third phase of the electric motor based on the second measured currents in the first and second phases of the motor.

6. The method according to claim 1, wherein the step of determining a second value of motor shaft position is accomplished by using a resolver.

7. A system for diagnosing potential discrepancies in electrical operating characteristics in a three phase electric motor comprising:
    a controller; and
    a control system embodied within the controller for directing the controller to control the steps of determining first currents in each motor phase with first set of current sensors, determining a first value of motor shaft position, estimating a first value of motor torque using the first currents in each motor phase and the first value of motor shaft position, determining second currents in each motor phase with a second set of current sensors, determining a second value of motor shaft position, estimating a second value of motor torque using the second currents in each motor phase and the second value of motor shaft position, comparing the first and second estimates of motor torque for discrepancies, and notifying an operator of a potential discrepancy in electrical operating characteristics.

8. An automotive vehicle comprising:
    a three phase electric motor;
    a controller; and
    a control system embodied within the controller for directing the controller to control the steps of determining first currents in each motor phase with first set of current sensors, determining a first value of motor shaft position, estimating a first value of motor torque using the first currents in each motor phase and the first value of motor shaft position, determining second currents in each motor phase with a second set of current sensors, determining a second value of motor shaft position, estimating a second value of motor torque using the second currents in each motor phase and the second value of motor shaft position, comparing the first and second estimates of motor torque for discrepancies, and notifying an operator of a potential discrepancy in electrical operating characteristics.

* * * * *